US006226978B1

(12) United States Patent
Chandra et al.

(10) Patent No.: US 6,226,978 B1
(45) Date of Patent: May 8, 2001

(54) HOT GAS-CARRYING GAS COLLECTION PIPE OF GAS TURBINE

(75) Inventors: Sharad Chandra, Oberhausen; Berthold Ellermann, Hünxe; Heinz Gathmann, Bochum; Werner Schnieders, Dortmund, all of (DE)

(73) Assignee: GHH Borsig Turbomaschinen GmbH (DE)

( * ) Notice: Subject to any disclaimer, the term of this patent is extended or adjusted under 35 U.S.C. 154(b) by 0 days.

(21) Appl. No.: 09/263,036

(22) Filed: Mar. 5, 1999

(30) Foreign Application Priority Data

Apr. 7, 1998 (DE) ..................................... 198 15 473

(51) Int. Cl.[7] ............................................ F02C 3/00
(52) U.S. Cl. ............................................. 60/39.75
(58) Field of Search ................................. 60/753, 39.75

(56) References Cited

U.S. PATENT DOCUMENTS

| | | | |
|---|---|---|---|
| 4,248,940 | 2/1981 | Goward et al. . | |
| 4,585,481 | 4/1986 | Gupta et al. . | |
| 4,942,732 * | 7/1990 | Priceman | 60/753 |
| 5,154,885 | 10/1992 | Czech et al. . | |
| 5,749,229 * | 5/1998 | Abuaf et al. | 60/757 |

FOREIGN PATENT DOCUMENTS

| | | |
|---|---|---|
| 28 42 848 C2 | 4/1979 | (DE) . |
| 32 34 090 C2 | 4/1983 | (DE) . |
| 42 42 099 A1 | 6/1994 | (DE) . |
| WO 89/07159 | 8/1989 | (WO) . |
| WO 91/02108 | 2/1991 | (WO) . |
| WO 96/34128 | 10/1996 | (WO) . |
| WO 96/34129 | 10/1996 | (WO) . |

* cited by examiner

*Primary Examiner*—Charles G. Freay
(74) *Attorney, Agent, or Firm*—McGlew and Tuttle, P.C.

(57) ABSTRACT

A hot gas-carrying gas collection pipe (1) of a gas turbine, which is arranged between the combustion chamber and the turbine blades. The gas collection pipe (1) has two inlet openings (2) for receiving the hot gas. The outlet comprises the flanges (5, 6), which are connected to the turbine. The material of the gas collection pipe (1) is a high-temperature- and corrosion-resistant base metal (9) with a high-temperature corrosion and oxidation coating (4) applied to both the inside and the outside of the base metal (9). In the area of the inner cone (13), an HTCO coating (4) is applied to the base metal (9) on one side and a thermal barrier coating (8) is applied on the opposite side.

12 Claims, 2 Drawing Sheets

HOT GAS-CARRYING GAS COLLECTION PIPE OF GAS TURBINE

FIELD OF THE INVENTION

The present invention pertains to a hot gas-carrying gas collection pipe of a gas turbine between the combustion chamber and the inlet flange of the turbine blades made of a high-temperature-and corrosion-resistant base metal M (substrate) with a high-temperature corrosion and oxidation coating applied to the inside and outside of the pipe.

BACKGROUND OF THE INVENTION

In gas turbines, the two-armed gas collection or bifurcated pipe between the combustion chamber housing and the inlet flange of the turbine blades is subject to an extreme stress and increased wear due to temperature, pressure and corrosion during hot operation.

The combustion air is compressed in a compressor to a high pressure, and an essential portion is used for combustion in the two combustion chambers, and a smaller portion is used to cool the hot metal parts.

The essential percentage of the $O_2$ of the air is used for oxidation in the combustion chambers by burning a carbon carrier. Nitrogen remains in the exhaust gas as a ballast and is additionally brought to high temperatures under high pressure and it flows from the combustion chambers into the bifurcated pipe and from there into the turbine to the turbine inlet blades and sets same into increased rotation.

The gas collection or bifurcated pipe consists of an iron-nickel-base material. This is attacked by high pressure and especially by an elevated gas temperature, with oxygen oxidizing the metal surface.

The alloying elements of the Ni-base alloy, such as aluminum, chromium or the like, reduce a further oxidation by forming solid oxide coatings.

However, this passive oxide coating does not prevent nitrogen from penetrating, so that the nitrogen can form nitrides or carbonitrides with the above-mentioned alloying elements over time, and the formation of these nitrides and carbonitrides is thermodynamically facilitated by the higher pressure of the gas.

The consequence is that depending on the alloying constituents and the solubility of $N_2$, AlN (nitrides) and/or Cr carbonitrides may be formed under the oxide coating.

This leads to the binding of the aluminum concentration in the metal, on the one hand, so that the oxidation resistance decreases and AlN needles and/or Cr carbonitrides are formed, which leads to an embrittlement of the metal.

This mechanism takes place not only in the combustion space of the bifurcated pipe, but also in the outer surface, which come into contact with the cooling air and which cannot always be cooled to the extent that the said gas-metal reaction can take place.

As a high-temperature corrosion protection, the entire inside of the gas collection pipe is lined with an MCrAlY monolayer, which is characterized by increased chromium and Al content. A nickel-based spray powder containing 31% of Cr, 11% of Al and 0.6% of Y is used here.

The high-temperature corrosion and oxidation coating develops a high resistance potential against oxidation and the nitrogen content increase and consequently an increased high-temperature corrosion and oxidation resistance because of the increased Cr and Al contents in conjunction with yttrium.

Heat-insulating coatings (TBC=Thermal Barrier Coating) are applied as an additional corrosion and heat protection on the surface of the inner cone of the gas collection pipe, to which the hot gas is admitted.

The heat-insulating coating is a plasma-sprayed coating system consisting of a bond coat and a ceramic top coat, which brings about the heat insulation of the coating system.

The bond coat is used, besides for bonding the top coat, also to avoid the high-temperature corrosion and oxidation of the material. To optimally assume both functions, this bond coat consists of a two-layer MCrAlY coat, a so-called bond coat A and B.

Bond coat A is a ductile MCrAlY coating with reduced chromium and aluminum content in order to guarantee long-term optimal bonding to the substrate.

Bond coat B is an MCrAlY coat with increased chromium and aluminum content. As a result, the increase in the nitrogen content in the base material is prevented, besides the increased high-temperature corrosion and oxidation resistance.

The top coat consists of a $ZrO_2$—$Y_2$—$O_3$ ceramic and brings about the heat insulation of this coat because of its lower thermal conductivity.

High-temperature-and corrosion-resistant protective coatings made of alloys and containing essentially nickel, chromium, cobalt, aluminum and an admixture of rare earth metals for gas turbine components, which require high corrosion resistance at medium and high temperatures and are in direct contact with the hot exhaust gases from the combustion chamber, have been developed and introduced on the market in many different compositions.

Multiple protective coatings for metal objects, especially gas turbine blades, have been known from WO 89/07159. Based on the discovery that there are two different corrosion mechanisms which are of significance for the life of such objects, two protective coatings arranged one on top of another are proposed, of which the inner coating offers protection against corrosive effects at temperatures of 600° C. to 800° C. and the outer coating is optimized for attacks at temperatures of 800° C. to 900° C. In addition, a thermal barrier coating may also be present as an outermost coating. A diffusion coating with a chromium content greater than 50% and with an iron and/or manganese content exceeding 10% is preferred as the first coating, and an MCrAlY coating, which contains, e.g., about 30% of chromium, about 7% of aluminum and about 0.7% of yttrium and is applied by plasma spraying under reduced pressure, is preferred as the second coating.

A protective coating, especially for gas turbine components, which possesses good corrosion properties in the temperature range of 600° C. to about 1,150° C., has been known from WO 91/02108. The protective coating contains (in weight percent) 25–40% of nickel, 28–32% of chromium, 7–9% of aluminum, 1–2% of silicon, 0.3–1% of yttrium, the rest being cobalt, at least 5%; and unavoidable impurities. Various optional components may be added. The properties of the protective coating can be further improved by adding rhenium. This effect appears even upon the addition of small quantities. A range of 4–10% of rhenium is preferred. P The coatings may be applied by plasma spraying or vapor deposition (PVD) and are especially suitable for gas turbine blades made of a superalloy based on nickel or cobalt. Other gas turbine components, especially in the case of gas turbines with a high inlet temperature exceeding, e.g., 1,200° C., may also be provided with such protective coatings.

A nickel or cobalt metal alloy, to which a protective coating against increased temperature attacks and corrosive attacks of hot gases from the combustion chamber of a gas turbine is applied, has been known from WO 96/34128.

The three-layer protective coating comprises a first bond coat consisting of an MCrAlY composition against the base metal to be protected and a second anchoring coating against the outer oxide coating.

A metal substrate based on a nickel or cobalt alloy, to which a protective system against increased temperature, corrosion and erosion is applied, has been known from WO 96/34129.

The protective system comprises an intermediate coating, consisting of a bonding coating against the Ni substrate and an anchoring coating against the outer ceramic coating based on zirconium oxide. The outer ceramic coating acts as a thermal barrier coating.

A device, especially a gas turbine means, with a coating of components of the device, has been known from DE 42 42 099.

Components in gas turbine systems and similar devices, which come into contact with hot gases during their operation, are provided with a coating there, which has both a corrosion protective action and a catalytic action. Components in the temperature range higher than 600° C. are provided with a coating that has an oxidation-catalyzing action, and components in a temperature range of 350° C. to 600° C. are provided with a coating having a reduction-catalyzing action. Mixed oxides with perovskite or spinel structure based on LaMn are used for the coating of the first type, and mixed oxides of the same structure based on LaCu are used for the coating of the second type.

SUMMARY AND OBJECTS OF THE INVENTION

The primary object of the present invention is to prevent the gas-metal reaction on the hot inner surface of the collection and mixing pipe or to slow it down to the extent that the life of these components will be considerably prolonged, and to prevent the gas-metal reaction even on the cooled outer surface of the collecting mixing pipe or to slow it down to the extent that the life of the components will be considerably prolonged.

According to the invention, a hot gas-carrying gas collection pipe of a gas turbine between the combustion chamber and the inlet flange of the turbine blades is made of a high-temperature-resistant and corrosion-resistant base metal M. A high-temperature corrosion and oxidation coating is applied on both the inside and the outside of the base metal of the gas collection pipe.

The surfaces of the hot gas-carrying gas collection or bifurcated pipe between the combustion chamber housing and the turbine are therefore provided according to the present invention on both the inside and the outside with a high-temperature corrosion and oxidation coating, which consists of a monolayer MCrAlY coating, so that a gas-metal reaction of nitrogen with the metal of the gas collection pipe is prevented or extensively slowed down. The base metal M may consist of an iron-nickel or iron-chromium alloy (M=Ni or Cr).

The high-temperature corrosion and oxidation coating containing 31% of Cr, 11% of Al, 0.6% of Y, the rest being nickel, therefore has such high Cr and Al contents that there is a high resistance potential in the protective coating against oxidation and the nitrogen content increase and consequently an increased high-temperature corrosion and oxidation resistance.

The coating of the complete bifurcated pipe, inside and outside, is carried out manually or as a program-controlled MCrAlY plasma coating with a coating thickness of 60≅40 $\mu$m.

The inner cone of the gas collection pipe is additionally lined with a thermal barrier coating on one side at the transition to the gas turbine. This thermal barrier coating has been known to consist of a two-layer MCrAlY coating—coatings A and B—and a ceramic top coat.

The bond coat A is a ductile MCrAlY coating with reduced chromium and aluminum contents to guarantee the adhesion of this coating to the base material of the gas collection pipe.

The composition of the bond coat B corresponds to that of the high-temperature corrosion and oxidation coating.

The thermal barrier coating is complemented by a ceramic top coat based on zirconium, which brings about the heat insulation because of its low thermal conductivity. The thermal barrier coating is composed of a coating thickness of 60/60/250 $\mu$m.

The gas collection pipe is additionally provided with an anti-wear coating at both inlet openings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
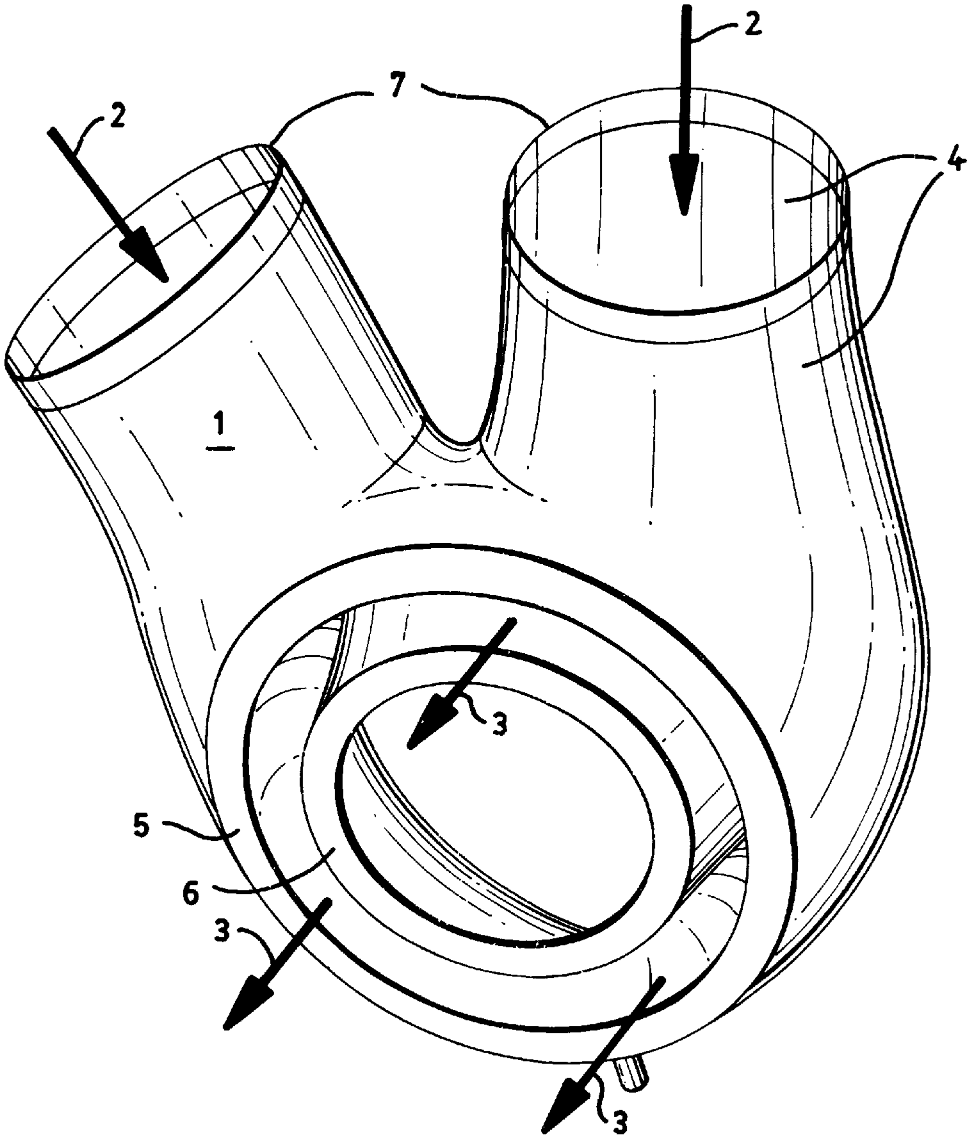
FIG. 1 is a schematic multidimensional view of a gas collection pipe according to the invention.

Referring to the drawings in particular, FIG. 1 shows a multidimensional view of the gas collection or bifurcated pipe 1 with inlet openings 2 arranged in the upper area for the hot gas from the two combustion chambers, not shown.

The gas collection pipe 1 is lined with a high-temperature corrosion and oxidation coating 4 on both the outside and the inside.

The hot gas (see arrows) flows from the two combustion chambers through the inlet openings 2 into the gas collection pipe 1, it is collected in the lower gas collection chamber 3 and it leaves the gas collection pipe 1 in the direction of the turbine, and the gas collection pipe 1 is connected to the mating flanges of the turbine by an outer flange 5 and an inner flange 6.

Figure 2:
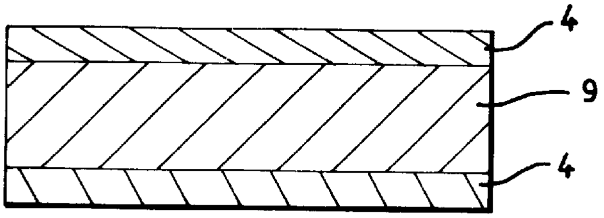
FIG. 2 is a schematic sectional view through the bifurcated pipe with the high-temperature corrosion and oxidation coating.

FIG. 2 shows a section through the wall of the bifurcated pipe with the high-temperature corrosion and oxidation (HTCO) coating. An HTCO coating 4 with a thickness of 60 $\mu$m is applied on both sides of the base metal 9.

Figure 3:
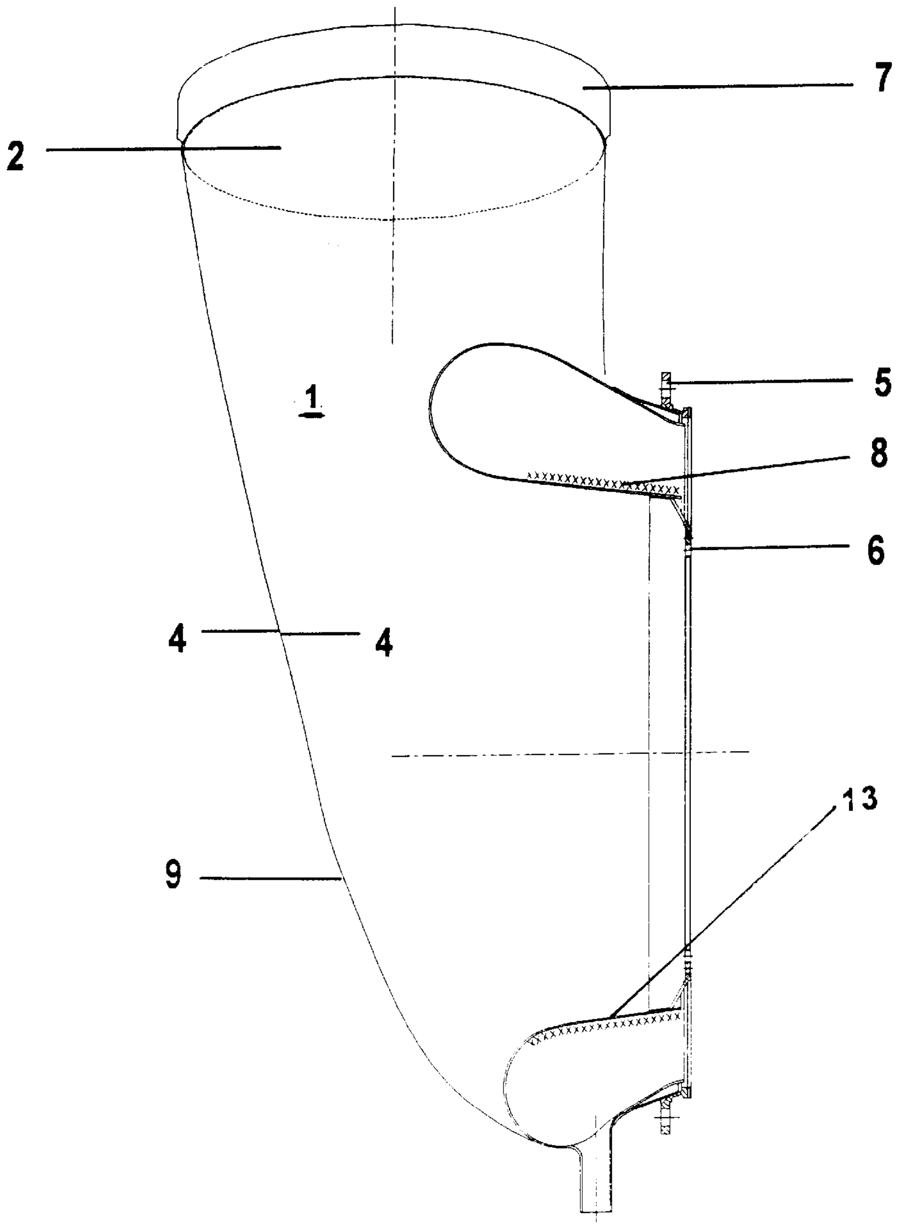
FIG. 3 is a schematic sectional view through the gas collection pipe in the area of one of the two inlet openings.

FIG. 3 shows a section through the gas collection pipe 1, which is arranged between the combustion chamber housings, not shown, and a downstream turbine.

The hot and corrosive exhaust gas leaves the mixing pipe and flows through the inlet opening 2 into the gas collection pipe 1, which is arranged within a housing, not shown, between the flanges of the combustion chamber housing and the flanges of the turbine.

The base metal 9 of the gas collection pipe 1 coated with an HTCO coating 4 on both sides is cooled by a cooling medium on the outside.

The compressed hot gas is brought together in the lower gas collection pipe 3 between the flanges 5 and 6 before it flows into the turbine and sets the rotor disk with the rotor blades into rotation.

The inlet openings 2 of the gas collection pipe 1 are additionally provided with an anti-wear coating 7 in the gas inlet area.

The inner cone 13 is additionally lined with a thermal barrier coating 8 instead of the HTCO coating 4 in the area of the flange.

Figure 4:
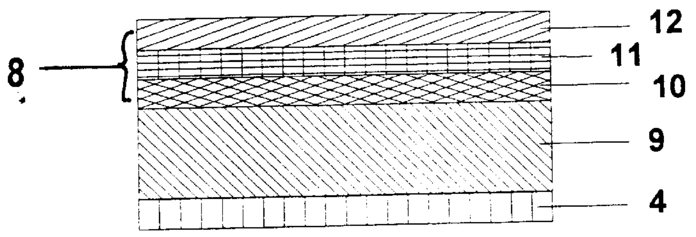
FIG. 4 is a schematic a sectional view through the thermal barrier coating.

According to FIG. 4, the thermal barrier coating 8 comprises a two-layer (A and B MCrAlY coating, wherein coating A 10 acts as a bond coat against the base metal 9 and coating B 11 as a bond coat against the ceramic coating 12.

In this area of the inner coat, the substrate/base metal 9 is protected by the HTCO coating 4 on one side and by a thermal barrier coating 8 on the other side.

While specific embodiments of the invention have been shown and described in detail to illustrate the application of the principles of the invention, it will be understood that the invention may be embodied otherwise without departing from such principles.

APPENDIX

List of Reference Numbers

1 Gas collection or bifurcated pipe

2 Inlet openings to 1

3 Lower gas collection space

4 High-temperature corrosion and oxidation coating

5 Outer flange

6 Inner flange

7 Anti-wear coating on 2

8 Thermal barrier coating on one side

9 Substrate/base metal

10 MCrAlY coating A

11 MCrAlY coating B

12 Ceramic coating

13 Inner cone

What is claimed is:

1. A hot gas-carrying gas collection pipe of a gas turbine between the combustion chamber and the inlet flange of the turbine blades, the pipe comprising:

a high-temperature resistant and corrosion-resistant base metal M, consisting of a nickel base alloy; and a high-temperature corrosion and oxidation coating applied on both the inside and the outside of said base metal of said gas collection pipe, said high-temperature corrosion and oxidation coating MCrAlY consisting of 31% of Cr, 11% of Al and 0.6% of Y, wherein M is the material of said base metal.

2. The hot gas-carrying gas collection pipe in accordance with claim 1, wherein the pipe includes an inner cone and said base metal of the inner cone is additionally lined with a heat-insulating coating on one side.

3. The hot gas-carrying gas collection pipe in accordance with claim 2, wherein said heat-insulating coating has a two-layer MCrAlY coat and a ceramic top coat and wherein M is the material of said base metal.

4. The hot gas-carrying gas collection pipe in accordance with claim 3, wherein said high-temperature corrosion and oxidation coating applied on both the inside and the outside consists of an inner layer and an outer layer; said inner layer being a ductile MCrAlY coat which Cr—and Al-content is lower than the Cr-and Al-content in said outer layer.

5. The hot gas-carrying gas collection pipe in accordance with claim 1, wherein the pipe includes an inner cone and said base metal of the inner cone is additionally lined with a heat-insulating coating on one side.

6. A hot gas-carrying gas collection pipe of a gas turbine between the combustion chamber and the inlet flange of the turbine blades, the pipe comprising:

a high-temperature-resistant and corrosion-resistant iron and nickel base metal forming a gas turbine collection pipe base;

a high-temperature MCrAlY corrosion and oxidation inner coating, wherein M is the material of said base metal, said inner coating being applied on the higher temperature exposure inside of said base metal of said gas turbine collection pipe base; and a high-temperature MCrAlY corrosion and oxidation outer coating, wherein M is the material of said base metal, said outer costing being applied on the cooled outside of said base metal of said as turbine collection pipe base.

7. The hot gas-carrying gas collection pipe in accordance with claim 6, wherein said base metal consists of a nickel base alloy.

8. The hot gas-carrying gas collection pipe in accordance with claim 6, wherein each MCrAlY high-temperature corrosion and oxidation coating consists essentially of 31% of Cr, 11% of Al and 0.6% of Y.

9. The hot gas-carrying gas collection pipe in accordance with claim 6, wherein the pipe includes an inner cone and said base metal of the inner cone is additionally lined with a heat-insulating coating on one side.

10. The hot gas-carrying gas collection pipe in accordance with claim 9, wherein said heat-insulating coating has a two-layer MCrAlY coat and a ceramic top coat and wherein M is the material of said base metal.

11. The hot gas-carrying gas collection pipe in accordance with claim 10, wherein one layer of said coating is a ductile MCrAlY coating and the other layer of said coating is an MCrAlY coating, said one layer has deceased Cr and Al content as compared to said other layer and wherein M is the material of said base metal.

12. A hot gas-carrying gas collection pipe of a gas turbine between the combustion chamber and the inlet flange of the turbine blades, the pipe being exposed to high temperature gas at an inner side and being exposed to cooling gas on an outer side, the pipe comprising:

a high-temperature-resistant and corrosion-resistant iron and nickel base metal forming a gas turbine collection pipe base;

a high-temperature MCrAlY corrosion and oxidation inner coating, wherein M is the material of said base metal, said inner coating being applied on the higher temperature exposure inside of said base metal of said gas turbine collection pipe base; and a high-temperature MCrAlY corrosion and oxidation outer coating, wherein M is the material of said base metal, said outer coating being applied on the cooled outside of said base metal of said gas turbine collection pipe base, said inner coating being a ductile MCrAlY coating which Cr-and Al-content is lower than the Cr-and Al-content in said outer coating.

* * * * *